United States Patent [19]

Shiraki et al.

[11] Patent Number: 4,530,966

[45] Date of Patent: * Jul. 23, 1985

[54] PROCESS FOR CONTINUOUSLY POLYMERIZING A BLOCK COPOLYMER AND THE BLOCK COPOLYMER MIXTURE OBTAINED THEREFROM

[75] Inventors: Toshinori Shiraki, Yamato, Japan; Akio Yamori, Victoria, Australia; Hideo Morita, Yokohama, Japan

[73] Assignee: Asahi Kasei Kogyo Kabushiki Kaisha, Osaka, Japan

[ * ] Notice: The portion of the term of this patent subsequent to Jul. 23, 2002 has been disclaimed.

[21] Appl. No.: 509,666

[22] Filed: Jun. 30, 1983

Related U.S. Application Data

[62] Division of Ser. No. 296,955, Aug. 27, 1981, abandoned.

[30] Foreign Application Priority Data

Sep. 6, 1980 [JP] Japan ................................ 55-122951
Sep. 6, 1980 [JP] Japan ................................ 55-122952
Sep. 6, 1980 [JP] Japan ................................ 55-122953

[51] Int. Cl.$^3$ .......................................... C08F 297/04
[52] U.S. Cl. ...................................... 525/89; 525/314
[58] Field of Search ............................................ 525/89

[56] References Cited

U.S. PATENT DOCUMENTS 4,051,197 9/1977 Fodor ................................. 525/314
4,080,407 3/1978 Fodor ................................. 525/314
4,291,139 9/1981 Halasa ................................ 525/314

Primary Examiner—Paul R. Michl

Attorney, Agent, or Firm—Birch, Stewart, Kolasch & Birch

[57] ABSTRACT

A block copolymer containing two or more polymer blocks composed mainly of an aromatic vinyl hydrocarbon and one or more polymer blocks composed mainly of a conjugated diene having excellent mechanical properties can be advantageously prepared by (a) batchwise preparing the specified living polymer (i.e. prepolymer) of at least one aromatic vinyl hydrocarbon polymer block by using a portion of monomers, and, then, (b) continuously preparing the block copolymer for continuously polymerizing the remainder of the monomers by continuously supplying the prepolymer to the first polymerization vessel of a continuous polymerization zone and simultaneously supplying the remainder of the monomers in the form of a monomer composed mainly of the aromatic vinyl hydrocarbon and/or a monomer composed mainly of the conjugated diene continuously and separately to the subsequent polymerization vessel(s). Furthermore, a block copolymer mixture containing two or more polymer blocks composed mainly of an aromatic vinyl hydrocarbon and one or more polymer blocks composed mainly of a conjugated diene having a high mutual interaction between the block copolymers therein can be advantageously prepared by (a) batchwise preparing the prepolymer and, then, (b) continuously preparing the block copolymers having the aromatic vinyl hydrocarbon contents thereof substantially continuously changed with an increase in the molecular weight of the block copolymers by broadening the molecular-weight distribution of at least one polymer block formed in the continuous polymerization zone (b).

26 Claims, 9 Drawing Figures

PROCESS FOR CONTINUOUSLY POLYMERIZING A BLOCK COPOLYMER AND THE BLOCK COPOLYMER MIXTURE OBTAINED THEREFROM

This application is a divisional of copending application Ser. No. 296,955, filed on Aug. 27, 1981, abandoned.

The present invention relates to a process for continuously preparing a block copolymer composed of a conjugated diene and an aromatic vinyl hydrocarbon and, more specifically, it relates to a process for preparing the block copolymer by using a batchwise method and a continuous method in combination, in which a portion of monomers to be formed into the block copolymer is previously polymerized in the presence of an organic lithium compound as a catalyst to prepare a specific living polymer and, then, the remainder of the monomers are continuously polymerized in the presence of the living polymer.

The present invention also relates to a novel block copolymer mixture comprising a conjugated diene and an aromatic vinyl compound and the preparation process thereof and, more specifically, it relates to a novel block copolymer mixture in which the aromatic vinyl hydrocarbon contents of the block copolymers contained in the mixture are substantially continuously changed (i.e. decreased and/or increased) with the increase in the molecular weight thereof, and the preparation process thereof.

A block copolymer composed of a conjugate diene and an aromatic vinyl hydrocarbon has an elasticity comparable to that of a vulcanized natural rubber or synthetic rubber at normal temperatures even in the unvulcanized state, when the aromatic vinyl hydrocarbon content is relatively low, and furthermore, this block copolymer has a processability comparable to that of a thermoplastic resin at high temperatures. Accordingly, this block copolymer is widely used in the fields of footwear, modified plastics, asphalts and adhesives. On the other hand, when the aromatic vinyl hydrocarbon content is relatively high, a transparent thermoplastic resin having an excellent impact resistance is obtained and the amount used of this block copolymer is now increasing mainly in the field of food-packaging vessels.

Processes for preparing such a block copolymer have been known and are disclosed, for example, in Japanese Patent Publications Nos. 19286/61, 23798/65, 17979/68, 36957/74 and 4106/73. Each of these known processes is a batchwise polymerization process, and from the viewpoints of increasing the productivity, stabilization and uniformalization of the quality and attainment of the labor-saving effect, development of a continuous polymerization process has been desired.

The continuous polymerization process for the production of block copolymers has been studied, but a process capable of continuously preparing a block copolymer having the above-mentioned excellent properties on an industrial scale has not been developed. For example, U.S. Pat. No. 3,356,763 discloses a process for continuously preparing a block copolymer comprising polymerizing a mixture of a conjugated diene and a vinyl aromatic hydrocarbon in the presence of an organic lithium compound, and continuously supplying the resultant living random copolymer and unreacted monomers into a tube reactor and polymerizing the same in said tube reactor. In this process, however, when an organic monolithium compound is used as a catalyst, there is obtained only a two-block type block copolymer comprising a copolymer block composed of the conjugate diene and aromatic vinyl hydrocarbon and a homopolymer block of the aromatic vinyl hydrocarbon. This block copolymer exhibits only a very low tensile strength in the unvulcanized state.

Japanese Patent Publications Nos. 38029/74 and 13320/75 disclose processes in which a block copolymer comprising at least three blocks is continuously prepared by using an organic monolithium compound as a catalyst. However, these processes are still defective from the industrial point of view in the following points. In the process disclosed in the former reference, 2n of polymerization vessels connected in series are used and a block copolymer comprising 2n of blocks is continuously prepared. In order to obtain a block copolymer having excellent properties, it is indispensable that the average residence time in the even-numbered polymerization vessels should be set at 4 to 30 minutes. This limitation of the residence time means a small variability of the manufacturing rate. In the process disclosed in the latter reference, when a polymer block of the aromatic vinyl hydrocarbon is formed, polymerization is carried out under such conditions that stirring is effected in the lateral direction but stirring in the vertical direction is prevented. However, a considerably high polymerization technique is required for performing polymerization under such specific conditions. Accordingly, this process is not a process that can be worked easily and simply.

On the other hand, as the fields of application of the block copolymers become wide, there is a problem in that various properties required in the various application fields cannot be satisfied with only a single block copolymer. Accordingly, it is desired in the art that the above-mentioned problem be solved.

Recently, in order to solve the above-mentioned problem, the combination use of block copolymers having different compositions has been proposed. For instance, Japanese Patent Laid-Open Application Nos. 27447/77 and 235/78 disclose the combined use of two types of block copolymers having different aromatic vinyl hydrocarbon contents as a sealing material and a pressure-sensitive adhesive tape. This combined use of two types of block copolymers results in an improved effect which cannot be obtained by the use of a single block copolymer. In addition, Japanese Patent Laid-Open Application No. 62251/79 discloses a method in which a high-impact resin having a good transparency is obtained by using polystyrene together with two types of block copolymers.

However, since these methods use block copolymers having completely different aromatic vinyl hydrocarbon contents, there are disadvantages in that the interaction between these block copolymers is poor and a synergetic effect cannot be fully obtained. In addition, in the prior art methods, since the block copolymers are previously prepared and since these block copolymers should be mixed with each other at a desired mixing ratio, the preparation operation is extremely troublesome.

Accordingly, an object of the present invention is to obviate the above-mentioned problems of the conventional continuous polymerization of block copolymers and to provide a process for continuously preparing the block copolymers having characteristics equivalent to or better than those obtained from the conventional batchwise polymerization.

Another object of the present invention is to provide a block copolymer mixture containing block copolymers having a large interaction effect with each other and an effective preparation method thereof.

Other objects and advantages of the present invention will be apparent from the following description.

In accordance with the present invention, there is provided a process for continuously preparing a block copolymer comprising at least two polymer blocks composed mainly of an aromatic vinyl hydrocarbon and at least one polymer block composed mainly of a conjugated diene in an inert hydrocarbon solvent comprising the steps of:

(a) batchwise preparing a living polymer (hereinafter referred to as "a prepolymer") containing at least one aromatic vinyl hydrocarbon polymer block having a numberaverage molecular weight of at least 5000 and a weight-average molecular weight to number-average molecular weight ratio of less than 1.5 by using a portion of monomers to be formed into the block copolymer in the presence of an organic lithium compound as a catalyst; and, then, (b) continuously preparing the block copolymer in at least one polymerization vessel, arranged in a continuous polymerization zone for continuously polymerizing the remainder of the monomers, by continuously supplying the prepolymer to the first polymerization vessel and simultaneously supplying the remainder of monomers in the form of at least one monomer group selected from the group consisting of a monomer group composed mainly of the aromatic vinyl hydrocarbon and a monomer group composed mainly of the conjugate diene continuously and separately, to the subsequent polymerization vessel or vessels.

In accordance with the present invention, there is also provided a block copolymer mixture comprising at least two polymer blocks composed mainly of an aromatic vinyl hydrocarbon and at least one polymer block composed mainly of a conjugated diene, said block copolymer mixture being continuously prepared in an inert hydrocarbon solvent by:

(a) batchwise preparing a living polymer (hereinafter referred to as "a prepolymer") containing at least one aromatic vinyl hydrocarbon polymer block having a number-average molecular weight of at least 5000 and a weightaverage molecular weight to number-average moleculer weight ratio of less than 1.5 by using a portion of monomers to be formed into the block copolymer in the presence of an organic lithium compound as a catalyst; and, then, (b) continuously preparing the block copolymer in at least one polymerization vessel, arranged in a continuous polymerization zone for continuously polymerizing the remainder of the monomers, by continuously supplying the prepolymer to the first polymerization vessel and simultaneously supplying the remainder of monomers in the form of at least one monomer group selected from the group consisting of a monomer group composed mainly of the aromatic vinyl hydrocarbon and a monomer group composed mainly of the conjugated diene continuously and separately, to the subsequent polymerization vessel or vessels and the aromatic vinyl hydrocarbon contents of the block copolymers contained in the block copolymer mixture being substantially continuously changed with the increase in the molecular weights of the block copolymers by broadening the molecular-weight distribution of at least one polymer block formed in the continuous polymerization zone (b).

The present invention will be better understood from the description set forth below with reference to the accompanying drawings in which.

Figure 8:
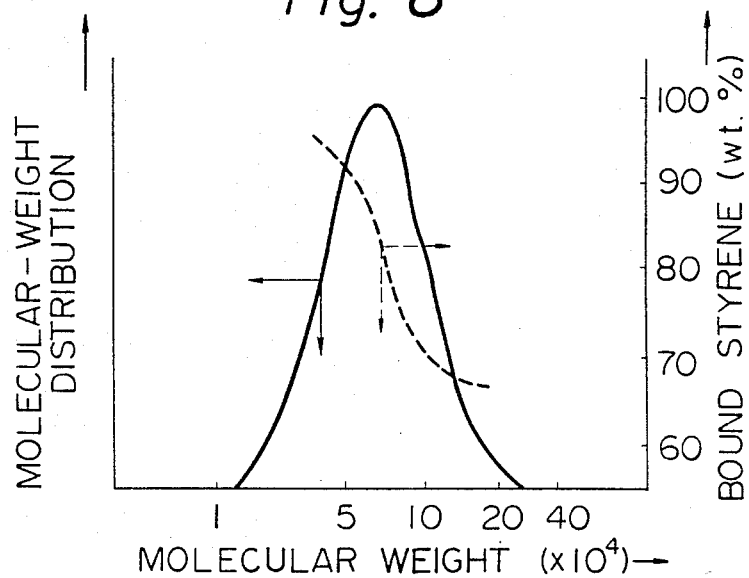
Figure 9:
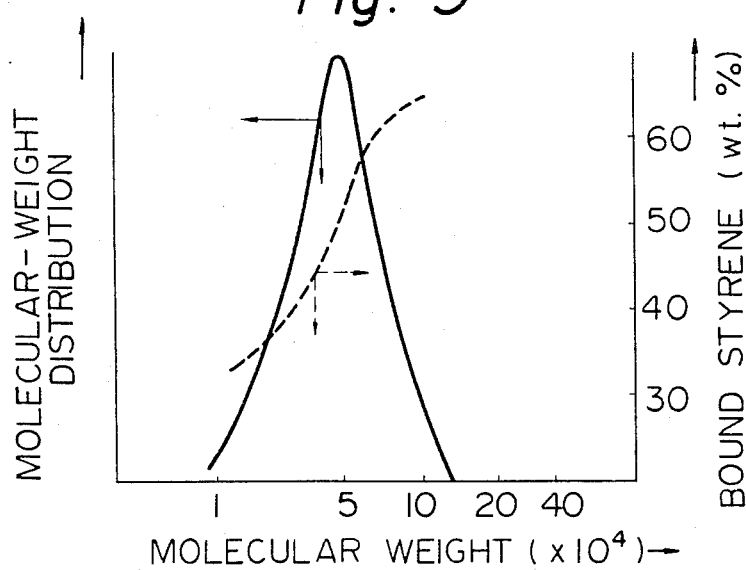

FIG. 8 is a graphical drawing illustrating the molecular-weight distribution (solid line) and the correlation between the molecular weight and the bound styrene content (dotted line) of the block copolymer mixture of Example 24; and FIG. 9 is a graphical drawing illustrating the molecular-weight distribution (solid line) and the correlation between the molecular weight and the bound styrene content (dotted line) of the block copolymer mixture of Example 26.

The present invention will now be described in detail.

The most important feature of the present invention is that a living polymer (i.e. a prepolymer) containing at least one polymer block of an aromatic vinyl hydrocarbon having a number-average molecular weight (hereinafter referred to as "$\overline{Mn}$") of at least 5000, preferably at least 7000, more preferably at least 9000, in which the ratio of the weight average molecular weight (hereinafter referred to as "$\overline{Mw}$") to $\overline{Mn}$ is less than 1.5, preferably less than 1.3, more preferably less than 1.2, is prepared in advance by using a portion of monomers and an organic lithium compound as a catalyst in a batchwise manner and the so obtained prepolymer is used as the catalyst at the subsequent continuous polymerization step. If $\overline{Mn}$ and $\overline{Mw}/\overline{Mn}$ of the aromatic vinyl hydrocarbon polymer block (hereinafter referred to as "Ap") contained in the prepolymer are outside the above-mentioned ranges, the mechanical properties, especially the tensile strength and impact resistance, of the final block copolymer are reduced. $\overline{Mn}$ and $\overline{Mw}/\overline{Mn}$ of Ap can be determined directly or indirectly by subjecting the Ap component, sampled from the prepolymer directly in case, of polystyrene, or after decomposition with a peroxide (see L. M. Kolthoff et al., J. Polymer Sci., 1, 429 (1946)) in case of a block copolymer, or a homopolymer of Ap obtained by carrying out polymerization under the same conditions as adopted for formation of the prepolymer, to gel permeation chromatography.

The aromatic vinyl hydrocarbon content in the prepolymer is at least 40% by weight and preferably at least 50% by weight, and in order to obtain a block copolymer having excellent tensile strength and impact strength, it is especially preferred that the aromatic vinyl hydrocarbon content in the prepolymer be at least 60% by weight. In the present invention, the structure of the prepolymer is not particularly critical, but the following model structures can be mentioned:

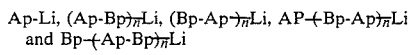

wherein Bp stands for a conjugated diene polymer block and/or a random copolymer block of the conjugated diene and aromatic vinyl hydrocarbon contained in the prepolymer, and n is an integer of at least 1, with the proviso that when Bp is the random copolymer block or contains the random copolymer segment, the aromatic vinyl hydrocarbon may be distributed uniformly or taperingly (or in a tapered form) along the polymer chain.

A living homopolymer of the aromatic vinyl hydrocarbon or a living polymer having the structure of Bp-Ap-Li is especially preferred as the prepolymer to be used in the present invention.

The number-average molecular weight of the prepolymer that is used in the present invention is 5000 to 300000, preferably 7000 to 100000 and more preferably 9000 to 50000.

The prepolymer which is used in the present invention is prepared in a batchwise manner. By the term "batchwise" used in the specification and appended claims is meant a method in which polymerization is carried out in a non-circulation type polymerization vessel by adding all the monomer at one time or divided in at least two times to the polymerization vessel. Namely, this method includes a so-called batchwise polymerization method, a so-called semi-batchwise polymerization method and a combination thereof. The monomer may be added continuously by using a pump or the like. As specific examples of the polymerization method for the production of the prepolymer, there can be mentioned methods disclosed in Japanese Patent Publications Nos. 19286/61 and 17979/68.

An organic monolithium compound containing one bonded lithium atom in the molecule is preferably used as the organic lithium compound for the preparation of the prepolymer in the present invention. For example, there can be used ethyl lithium, n-propyl lithium, isopropyl lithium, n-butyl lithium, sec-butyl lithium, tert-butyl lithium, n-pentyl lithium, tert-octyl lithium, phenyl lithium, tolyl lithium, butylphenyl lithium, cyclohexyl lithium and butylcyclohexyl lithium. n-Butyl lithium and sec-butyl lithium are conventional organic lithium compounds. Although polylithium compound catalysts can be used as an organic lithium catalyst in the practice of the present process, the present process has an advantage that the block copolymer having an excellent tensile strength and impact strength can be prepared even in the case where a monolithium catalyst is used.

Polymerization for the preparation of the prepolymer may be carried out without using a solvent at all. However, in order to advance the reaction uniformly and prevent occurrence of local abnormal reactions, it is preferred that at least one inert hydrocarbon be used as the solvent. The mixing ratio of the monomers to the solvent is ordinarily in the range of from 5/95 to 90/10 and preferably in the range of from 10/90 to 70/30. As the solvent, there may be used aliphatic hydrocarbons, alicyclic hydrocarbons and aromatic hydrocarbons, as described in detail hereinafter, and mixtures thereof. When the aromatic vinyl hydrocarbon content in the prepolymer is higher than about 75% by weight, a solvent composed mainly of an aromatic hydrocarbon or alicyclic hydrocarbon is preferably used since a prepolymer having an aromatic vinyl hydrocarbon content higher than about 75% by weight is hardly soluble in a solvent composed mainly of an aliphatic hydrocarbon. Accordingly, when a solvent composed mainly of an aliphatic hydrocarbon, namely a solvent containing at least 50% by weight, more generally at least 70% by weight, of an aliphatic hydrocarbon, is employed, it is preferred that the vinyl aromatic hydrocarbon content in the prepolymer be lower than about 75% by weight.

The continuous polymerization zone (b) in the process of the present invention will now be described in detail.

In the continuous polymerization zone (b) of the present invention, at least one polymerization vessel connected in series is used, and the above-mentioned prepolymer is continuously supplied to the first polymerization vessel, while in the subsequent polymerization vessel, the remainder of the monomers is continuously and separately supplied in the form of a monomer composed mainly of the aromatic vinyl hydrocarbon and/or a monomer composed mainly of the conjugated diene and is polymerized, whereby a block copolymer is continuously prepared. In the present invention, there may be optionally adopted a method in which a monomer composed mainly of the aromatic vinyl hydrocarbon and/or a monomer composed mainly of the conjugated diene is independently supplied continuously into at least one polymerization vessel in the continuous polymerization zone (b) from at least one supply inlet of said polymerization vessel and is continuously polymerized in said polymerization vessel. It is preferred that the monomer composed mainly of the aromatic vinyl hydrocarbon and the monomer composed mainly of the conjugated diene, which are supplied into the continuous polymerization zone (b), be polymerized in substantially different portions in the polymerization zone. Furthermore, in the present invention, there may be optionally adopted a method in which a polymer mixture containing unreacted monomers is supplied to the subsequent polymerization vessel or portion and is copolymerized with a fresh monomer supplied into said subsequent polymerization vessel or portion. As used herein, the expression "monomers continuously supplied into the continuous polymerization are polymerized in substantially different portions in the continuous polymerization zone (b)" means that polymerization is carried out under such conditions that the respective monomers are not substantially random-polymerized and preferably, at least 50% by weight, more preferably at least 70% by weight, of the respective monomers are not randomly polymerized. These conditions can easily be set by polymerizing the respective monomers in different polymerization vessels or in different portions of one polymerization vessel which are separated from each other by a partition wall such as a grating plate to prevent mingling of the monomers, or by separating supply inlets for the respective monomers from each other sufficiently to prevent mingling of the monomers or increasing the linear speed of the content of the polymerization vessel toward the outlet sufficiently to prevent mingling of the monomers by reverse flows.

Examples of polymerization modes in the continuous polymerization zone (b) of the present invention will now be described, though the scope of the present invention is not limited by these examples of polymerization modes.

Polymerization Mode (1)

At least two polymerization vessels connected in series are used, and the living polymer of the prepolymer is continuously supplied into the first polymerization vessel and simultaneously, a monomer composed mainly of the conjugated diene (or a monomer composed mainly of the aromatic vinyl hydrocarbon) is continuously supplied into the odd-numbered polymerization vessel and is polymerized in said polymerization vessel. The living polymer of the polymer obtained in the odd-numbered polymerization vessel is continuously supplied into the even-numbered polymerization vessel, and simultaneously, a monomer composed mainly of the aromatic vinyl hydrocarbon (or a monomer composed mainly of the conjugated diene) is continuously supplied in said polymerization vessel and polymerized therein.

Polymerization Mode (2)

In the polymerization mode (1), a monomer composed mainly of the conjugated diene and/or a monomer composed mainly of the aromatic vinyl hydrocarbon is further supplied continuously into at least one odd-numbered polymerization vessel and/or at least one even-numbered polymerization vessel from at least one supply inlet of the side face of said polymerization vessel and is polymerized in said polymerization vessel.

Polymerization Mode (3)

One polymerization vessel is used, and the living polymer of the prepolymer and a monomer composed mainly of the conjugated diene or a monomer composed mainly of the aromatic vinyl hydrocarbon are continuously supplied into said polymerization vessel and polymerized therein.

Polymerization Mode (4)

In the polymerization mode (3), a monomer composed mainly of the conjugated diene and/or a monomer composed mainly of the aromatic vinyl hydrocarbon is further supplied continuously into said one polymerization vessel from at least one supply inlet of the side face of the polymerization vessel and polymerized in said one polymerization vessel.

In the present invention, a block copolymer having any optional block structure can be prepared continuously by appropriately combining the block structure of the prepolymer, the number of polymerization vessels arranged in the continuous polymerization zone (b) and the manner of supplying the monomer into the continuous polymerization zone (b). For example, the following linear block structures can be mentioned:

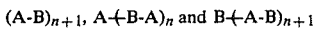

wherein A stands for a polymer block composed mainly of the aromatic vinyl hydrocarbon, B stands for a polymer block composed mainly of the conjugated diene, with the proviso that the boundary between the block A and block B need not be definite, and n is an integer of at least 1.

In the present invention, by the expression "polymer block A composed mainly of the aromatic vinyl hydrocarbon" is meant a polymer block having an aromatic vinyl hydrocarbon content of at least 50% by weight, which includes a copolymer block comprising a copolymer of more than 50% by weight of the aromatic vinyl hydrocarbon and the conjugated diene and a homopolymer block of the aromatic vinyl hydrocarbon. By the expression "polymer block B composed mainly of the conjugated diene" is meant a polymer block having a conjugated diene content of at least 50% by weight, which includes a copolymer block comprising a copolymer of more than 50% by weight of the conjugated diene and the aromatic vinyl hydrocarbon and a homopolymer block of the conjugated diene. In the copolymer portion which is optionally present in the block A or B, the vinyl aromatic hydrocarbon may be distributed uniformly or taperingly.

In the above-mentioned linear block copolymer, the molecular weight of each polymer block formed in the continuous polymerization zone (b) can be controlled by adjusting the amount of the active terminal of the living polymers, the amount of the monomers and the mixing characteristics of the polymerization vessel. In order to prepare a block copolymer having an excellent tensile strength or impact strength, it is desirable to prepare at least one aromatic vinyl hydrocarbon polymer block having a $\overline{M}n$ of at least 5000, preferably, at least 7000 and, more preferably, at least 9000 and having a $\overline{M}w/\overline{M}n$ of less than 1.5, preferably 1.3 or less and, more preferably, 1.2 or less, in the continuous polymerization zone (b).

In the present invention, the block copolymer continuously polymerized in the continuous polymerization zone (b) is in the state of a living polymer and, therefore, can be reacted with a polyfunctional compound mentioned in detail hereinbelow to prepare a block copolymer having a radial block structure as set forth below. The reaction of the living polymer with the polyfunctional compound may be effected continuously (subsequent to the preparation of the living polymer) or, batchwise by the addition of the polyfunctional compound to the living polymer after the storage of a certain amount of the living polymer.

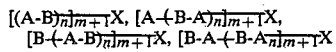

wherein A, B and n are defined above and X stands for the residual group of the polyfunctional compound and m is an integer of at least 1, preferably at least 2.

In the present invention, polymerization in the continuous polymerization zone (b) may be carried out in the absence of a solvent. However, in order to advance the reaction uniformly, to prevent occurrence of local abnormal reactions, for example, formation of a gelled polymer, and to reduce the viscosity of the resulting polymer solution, it is preferred that at least one inert hydrocarbon be used as the solvent. The mixing ratio of the monomers to the solvent is generally in the range of from 5/95 to 90/10, preferably in the range of from 10/90 to 70/30 and more preferably in the range of from 15/85 to 50/50. As in the case of the preparation of the prepolymer, any of the aliphatic hydrocarbons, alicyclic hydrocarbons, aromatic hydrocarbons and mixtures thereof can be used. From the industrial viewpoint, it is preferred that a solvent composed mainly of an aliphatic hydrocarbon which ordinarily exhibits a small evaporation latent heat when the block copolymer is recovered by distilling the solvent from the resulting block copolymer solution be used, because consumption of energy for distillation of the solvent can be reduced. However, when a solvent composed mainly of an aliphatic hydrocarbon is used, it is necessary that polymerization conditions should be selected so that the aromatic vinyl hydrocarbon content in the polymer being formed in the continuous polymerization zone (b) should be lower than about 75% by weight, preferably lower than 70% by weight. If the aromatic vinyl hydrocarbon content exceeds about 75% by weight, the formed polymer becomes insoluble in the solvent and is precipitated and separated from the reaction mixture and gradually accumulated in the polymerization vessel. Thus, long-period continuous polymerization operation cannot be effected.

In the process of the present invention, the average residence time in respective polymerization vessels in the continuous polymerization zone (b) is not particularly critical. However, in view of stability of the long-period continuous polymerization operation, productivity and prevention of physical properties of the block copolymer by deactivation of the living polymer, it is preferred that the average residence time be adjusted to from 3 minutes to 5 hours, preferably from 5 minutes to 3 hours and more preferably from 10 minutes to 2 hours. The polymerization temperatures in the respective polymerization vessels are determined according to the average residence time in the respective polymerization vessels and the conversion of the monomer to the polymer at the outlet of each polymerization vessel. However, in view of productivity and prevention of deactivation of the living polymer, polymerization in the continuous polymerization zone is generally carried out at 10° to 180° C., preferably at 30° to 140° C., and more preferably at 50° to 120° C. It is preferred that the inner atmosphere of each polymerization vessel be sufficiently replaced by an inert gas such as nitrogen gas. It is sufficient if the pressure in each polymerization vessel is high enough to maintain a liquid phase of the monomers and solvent at the above-mentioned polymerization temperature, and the pressure is not particularly critical so far as this requirement is satisfied. Furthermore, care should be taken so that impurities deactivating the living polymer, such as water, oxygen and carbon dioxide gas, are not introduced into the polymerization vessels.

The type of the polymerization vessel used in the continuous polymerization zone in the present invention is not particularly critical, and any of vessel-type, columntype and tube-type polymerization vessels may be used. However, in order to make the molecular-weight distribution of the polymer block formed in each reactor relatively uniform and also to facilitate the polymerization operation when the monomers separately supplied to plural inlets of each polymerization vessel are polymerized in substantially separate polymerization zones, the use of a polymerization reaction having an L/D of more than 7, preferably at least 8 and more preferably at least 10 is desirable. L designates the length between the upper tangential line and lower tangential line of the polymerization vessel, and D stands for the inner diameter of the polymerization vessel. Especially, in the above-mentioned polymerization modes (2) and (4), it is recommended to use a polymerization vessel in which the L/D ratio is more than 10, preferably at least 12 and more preferably at least 14. The upper limit of the L/D ratio is not critical and even a polymerization vessel having a very high L/D ratio, such as a loop-type polymerization vessel, can be used. However, from the viewpoint of the facility of the polymerization operation or the operation of cleaning the polymerization vessel, it is industrially preferred that the L/D ratio be 50 or less, more preferably 30 or less.

According to the present polymerization process, a block copolymer mixture containing the block copolymers having different aromatic vinyl hydrocarbon contents can be prepared by broadening the molecular-weight distribution of at least one polymer block in the formation of the polymer blocks in the continuous polymerization zone (b). The block copolymer mixture has such a composition distribution that the aromatic vinyl hydrocarbon content of the block copolymer contained in the block copolymer mixture is substantially continuously changed with the increase in the molecular weights of the block copolymers. The broadening of the molecular-weight distribution of the polymer block can be readily effected by controlling the mixing characteristics in the polymer block formation zone of the polymerization vessel by selecting the shape of the polymerization vessel (e.g. L/D ratio), the agitation conditions and the like. For instance, the broadening of the molecular-weight distribution can be readily effected by using a polymerization vessel having an L/D of 7 or less, preferably 6 or less and, more preferably, 1 through 5.

In the case where a polymer block having a broad molecular-weight distribution is formed, the ratio $\overline{Mw}'/\overline{Mn}'$ is generally 1.5 or more, preferably 1.6 or more and, more preferably, 1.8 or more, wherein $\overline{Mw}'$ and $\overline{Mn}'$ represent $\overline{Mw}$ and $\overline{Mn}$ of the polymer block, respectively. The polymer block, the molecular-weight distribution of which should be broadened in the continuous polymerization zone (b), may be either a polymer block composed mainly of the aromatic vinyl hydrocarbon or a polymer block composed mainly of the conjugated diene. However, in the case where the final block copolymer mixture comprises the above-mentioned linear block copolymers, it is desirable that the $\overline{Mw}'/\overline{Mn}'$ of at least one polymer block composed mainly of the aromatic vinyl hydrocarbon should be maintained to be less than 1.5, preferably 1.3 or less and more preferably 1.2 or less, and that the $\overline{Mw}'/\overline{Mn}'$ of the polymer block composed mainly of the conjugated diene should be broadened, since the block copolymer mixture having an excellent tensile strength or impact strength can be obtained.

The stirrer to be attached to the polymerization vessel used in the present invention is not particularly critical, and a polymerization vessel having no stirrer attached thereto can be used in the present invention. However, in order to advance the polymerization reaction uniformly, to remove the reaction heat effectively and to prevent the occurrence of a local abnormal reaction, it is generally preferred to use a polymerization vessel provided with a stirrer. Any of turbine-type, screw-type, anchor-type and static-type stirrers can be used in the present invention. Grating plates or baffle plates may be optionally disposed in the polymerization vessel.

The reaction vessel in which the living polymer obtained in the continuous polymerization zone (b) is reacted with the polyfunctional compound mentioned hereinbelow in the living state can be any type of reaction vessel, so long as the desired reaction can be substantially uniformly carried out. For example, in addition to the vessel-type and column-type reaction vessel as exemplified above, stationary vessel-type mixers such as trough-type, hopper-type and pan-type mixers and an in-line mixer (i.e. a stirrer mounted in a portion of the polymer solution transfer pipe) can also be used.

In the process of the present invention, it is preferred that the ratio of the amount of the monomers to be formed into a prepolymer to be supplied into the continuous polymerization zone (b) to the total amount of the remainder of the monomers to be supplied into the continuous polymerization zone (b) be 90/10 or less, preferably 80/20 or less, and more preferably 60/40 or less. If the ratio of the amount of the prepolymer to be supplied into the continuous polymerization zone (b) to the total amount of the remainder of the monomers to be supplied into the continuous polymerization zone (b) exceeds 90/10, the effect of improving the productivity by continuous polymerization is reduced and good results are not generally obtained. The lower limit of the ratio of the amount of the prepolymer to be supplied into the continuous polymerization zone (b) to the total amount of the remainder of the monomers to be supplied into the continuous polymerization zone (b) is not particularly critical. However, in view of facility of control of the polymerization operation and stability of the physical properties of the final block copolymer, it is preferred that the above-mentioned ratio be at least 5/95, preferably at least 10/90 and more preferably at least 15/85.

In the process of the present invention, the aromatic vinyl hydrocarbon content in the final block copolymer obtained by continuous polymerization can be adjusted according to the aromatic vinyl hydrocarbon content in the prepolymer, the amount of the prepolymer to be supplied into the continuous polymerization zone (b), the aromatic vinyl hydrocarbon content in the monomers to be supplied into the continuous polymerization zone (b) and the amount of the monomers to be supplied into the continuous polymerization zone (b). This content is ordinarily adjusted to 5 to 95% by weight, preferably 10 to 90% by weight and more preferably 15 to 85% by weight. When the aromatic vinyl hydrocarbon content in the block copolymer is at least 5% by weight but lower than 60% by weight, preferably 55% by weight or less, a thermoplastic elastomer excellent in the tensile strength and elasticity in the unvulcanized state can be obtained, while thermoplastic resin excellent in transparency and impact resistance can be obtained when the aromatic vinyl hydrocarbon content in the block copolymer is 60 to 95% by weight, preferably 65 to 90% by weight, more preferably, 70 to 85% by weight. The $\overline{M}n$ of the final block copolymer is 10,000 to 1,000,000 and preferably 30,000 to 500,000. If the $\overline{M}n$ is lower than 10,000, the mechanical properties, for example, the tensile strength and impact resistance, of the final block copolymer are reduced, and an $\overline{M}n$ exceeding 1,000,000 is not preferred because it is difficult or substantially impossible to eliminate bad influences by deactivation of the living polymer. The molecular weight of each polymer block formed in the continuous polymerization zone (b) can be adjusted by the amount of active terminal groups of the living polymer to be supplied into the portion for formation of said polymer block, the amount of the monomers and the mixing characteristic in the polymerization vessel.

The monomers, solvents and the like used in the practice of the present invention will now be described in detail.

In the present invention, the monomer composed mainly of the conjugated diene includes a monomer consisting solely of the conjugated diene and a monomer mixture of the conjugated diene and the aromatic vinyl hydrocarbon having a conjugated diene content higher than 50% by weight, and the monomer composed mainly of the aromatic vinyl hydrocarbon includes a monomer consisting solely of the aromatic vinyl hydrocarbon and a monomer mixture of the aromatic vinyl hydrocarbon and the conjugated diene having an aromatic vinyl hydrocarbon content higher than 50% by weight. The mixture of the conjugated te diene and the aromatic vinyl hydrocarbon need not be formed in advance by mixing the two monomers. The two monomers may be supplied from different supply inlets if they are supplied under such conditions that they are copolymerized.

The conjugated dienes used in the present invention can be any diolefins having a pair of conjugated double bonds, such as 1,3-butadiene, 2-methyl-1,3-butadiene (isoprene), 2,3-dimethyl-1,3-butadiene, 1,3-pentadiene, 1,3-hexadiene and the like. Genenerally 1,3-butadiene and isoprene are used. These conjugated dienes may be used alone or in any mixture thereof.

The aromatic vinyl hydrocarbons used in the present invention are, for example, styrene, methylstyrene, ethylstyrene, p-tert-butylstyrene, dimethylstyrene, α-methylstyrene, vinylnaphthalene, vinylanthracene and the like. Generally, styrene and α-methylstyrene are used. These aromatic vinyl hydrocarbons may be used alone or in any mixture thereof.

As pointed out hereinbefore, a solvent may be used in the process of the present invention. The solvents which can be used in the present invention are: for example, aliphatic hydrocarbons such as butane, pentane, hexane, isopentane, heptane, octane and isooctane; alicyclic hydrocarbons such as cyclopentane, methylcyclopentane, cyclohexane, methylcyclohexane and ethylcyclohexane; and aromatic hydrocarbons such as benzene, toluene, ethylbenzene and xylene. These solvents may be used alone or in any mixture thereof. In the present invention, by the term "the solvent composed mainly of an aliphatic hydrocarbon" is meant a solvent containing more than 50% by weight of an aliphatic hydrocarbon. If a small amount of a polar compound is added to such solvent, it is possible to increase the polymerization rate or to change the copolymerization ratio between the conjugated diene and the aromatic vinyl hydrocarbon, whereby a block copolymer having a desirable structure can be obtained. Examples of such polar compounds are ethers, amines, thioethers, phosphines and phosphoramides. As the ether, there are preferably used dimethyl ether, diethyl ether, diphenyl ether, tetrahydrofuran, diethylene glycol dimethyl ether and diethylene glycol dibutyl ether. As the amine, there are preferably used tertiary amines such as trimethylamine, triethylamine and tetramethylethylene diamine. Furthermore, cyclic tertiary amines may be used. As the phosphine and phosphoramide, there are preferably used triphenylphosphine and hexamethylphosphoramide. The amount added of the polar compound largely depends upon the kind of the polar compound to be used, the quantity of active points of the living polymer and the polymerization temperature. In the present invention, however, it is necessary that the addition amount of the polar compound is desirably controlled so that at least one aromatic vinyl hydrocarbon polymer block having a $\overline{Mn}'$ of at least 5000 is formed, when the aromatic vinyl hydrocarbon polymer block is formed in the continuous polymerization zone (b) of the present invention.

The polyfunctional compounds which can be used in the process of the present invention are those compounds which have at least two portions (or moieties) in the molecule capable of being reacted with the active point of the living polymer. Examples of such compounds are those which have at least two functional groups selected from the group consisting of a halogen group, an epoxy group, an ester group, an acid anhydride group, a ketone group, an aldehyde group, an isocyanate group, an imino group, a vinyl group and a vinylidene group. Examples of such polyfunctional compounds are polyhalides, polyepoxides, polyesters, polyanhydrides, polyketones, polyaldehydes, polyisocyanates, polyimines (polyaziridinyl), polyvinyl compounds and the like. These compounds may have two or more kinds of functional groups in the molecule, such as an epoxy group and an aldehyde group.

Typical examples of the polyfunctional compounds are dichloromethane, dibromomethane, dibromobutane, dichlorosilane, chloroform, trichlorosilane, carbon tetrachloride, carbon tetrabromide, tetrachlorosilane, tetrabromosilane, tin tetrachloride, tin tetrabromide, epoxidized hydrocarbon polymers such as epoxidized polybutadiene, epoxidized vegetable oils such as epoxidized soybean oil and epoxidized linseed oil, carboxylic acid esters such as diethyl succinate and glycerin stearate, acid anhydrides such as maleic anhydride and styrene/maleic anhydride copolymer, divinyl benzene tetravinyl silane and the like.

In the process of the present invention, gelation-preventing agents such as 1,2-butadiene, vinylacetylene, cyclopentadiene, primary and secondary amines, butyl chloride, butyl bromide and organic sulfonic acid salts can be used. This gelation-preventing agent is used in an amount of 1% or less, preferably 0.5% or less, based on the total amount of the monomers and solvent.

The block copolymer continuously prepared in the continuous polymerization zone (b) in the process of the present invention may be optionally deactivated by adding a polymerization stopper such as water, alcohols, organic acids or inorganic acids in an amount sufficient to deactivate active points of the living polymer. If a polymerization stopper such as carbon dioxide, an alkylene oxide or an alkylene sulfide is used instead of water or an alcohol and is reacted with the formed block copolymer, a block copolymer having at terminals thereof various functional groups, such as —OH, —SH, —COOH, —COCl, —SO₃H and —C≡N can be obtained. In order to improve the heat resistance and weatherability, various additives may be optionally added to the block copolymer.

As mentioned hereinabove, according to the present invention, the block copolymer mixture containing block copolymers having different aromatic vinyl hydrocarbon contents can be continuously prepared by broadening the molecular-weight distribution of at least one polymer block formed in the continuous polymerization zone (b). Furthermore, the block copolymer mixture of the present invention has such an extremely unique composition distribution that the aromatic vinyl hydrocarbon contents of the block copolymers contained in the mixture are substantially continuously increased and/or decreased, with the increase in the molecular weight, although the molecular-weight distribution of the total block copolymer mixture is substantially a single peak (i.e. monomodal). By the term "the aromatic vinyl hydrocarbon contents of the block copolymers are substantially continuously increased and/or decreased with the increase in the molecular weight used" as used herein is meant that no substantial discontinuous point is present in the change of the aromatic vinyl hydrocarbon contents corresponding to the change of the molecular weight of the block copolymers contained in the block copolymer mixture. The aromatic vinyl hydrocarbon contents may be monotonously continuously increased or decreased, or may be repeatedly changed from continuous increase or continuous decrease, with the increase in the molecular weight.

Generally speaking, the desirable block copolymer mixtures of the present invention are those of which aromatic vinyl hydrocarbon contents are monotonously continuously increased or decreased, with the increase in the molecular weight. By the term "the molecular-weight distribution of the total block copolymer mixture is a substantially single peak (i.e. monomodal)" is meant that, in the case where the molecular-weight distribution of the main components of the block copolymers contained in the mixture is determined according to a conventional analytical method such as gel permeation chromatography (GPC), two or more clear peaks are not observed. However, it should be noted that a so-called one or more shoulder peaks may be present around the single peak.

The block copolymer mixture of the present invention is composed of block copolymers in which the molecular weight of at least one polymer block of the block copolymer contained in the mixture is different from that of the other block copolymer(s) contained in the mixture. The polymer block of which the molecular-weight is mutually different may be either a polymer block composed mainly of an aromatic vinyl hydrocarbon or a polymer block composed mainly of a conjugated diene. However, it is desirable that the molecular weight of at least one polymer block composed mainly of a conjugated diene of the block copolymer in the mixture is mutually changed from that of the other block copolymers in the mixture. Furthermore, in the case where the block copolymer mixture is composed of the above-mentioned linear-type block copolymers having a linear block structure, more desirable block copolymer mixtures of the present invention are those which contain at least one aromatic vinyl hydrocarbon polymer block (formed in the continuous polymerization zone (b)) having an $\overline{Mn}'$ of at least 5000 and an $\overline{Mw}'/\overline{Mn}$ ratio of less than 1.5 and also which contain a block copolymer having at least one polymer block composed mainly of a conjugated diene so that the molecular weight of the polymer block is mutually different from that of the other block copolymers. On the other hand, in the case where the block copolymer mixture is composed of the above-mentioned radial-type block copolymers having a radial block structure, the block copolymer mixtures contain a block copolymer having at least one polymer block composed mainly of a conjugated diene so that the molecular weight of the polymer block is mutually different from that of the other block copolymer(s).

The desirable block copolymer mixtures of the present invention are those in which the difference in the aromatic vinyl hydrocarbon content between the component having a small aromatic vinyl hydrocarbon content and the component having a large aromatic vinyl hydrocarbon content of the main block copolymer components of the block copolymer mixture is at least 5% by weight, preferably at least 10% by weight and more preferably at least 15% by weight. By the term "the main block copolymer components of the block copolymer mixture" used herein is meant such block polymers in the resultant components that the low molecular-weight component and the high molecular-weight component contained in the mixture, for instance, 5% by weight each, preferably 10% by weight each and more preferably 15% by weight each, based on the total weight of the block copolymer mixture, of the low molecular-weight component and the high molecular-weight component, are removed.

The composition distribution of the block copolymer mixture can be determined by any known method. For instance, the block copolymer mixture is subjected to a molecular-weight fractionation in a conventional manner and the molecular weight and the aromatic vinyl hydrocarbon content of each fraction are determined. Otherwise, the molecular-weight distribution and the composition distribution can be simultaneously determined by using GPC. However, it should be noted that other known methods for determining the composition distribution of the block copolymer mixture can be used.

The preferred embodiments of the process according to the present invention will now be described with reference to the accompanying FIGS. 1 to 5, in which valves, pumps, pressure gauges, jackets for controlling polymerization temperatures through which a heat exchange medium such as steam or water is passed, heat exchangers for controlling the temperatures of the monomers to be fed to the polymerization vessels and the like are omitted for the sake of brevity.

Figure 1:
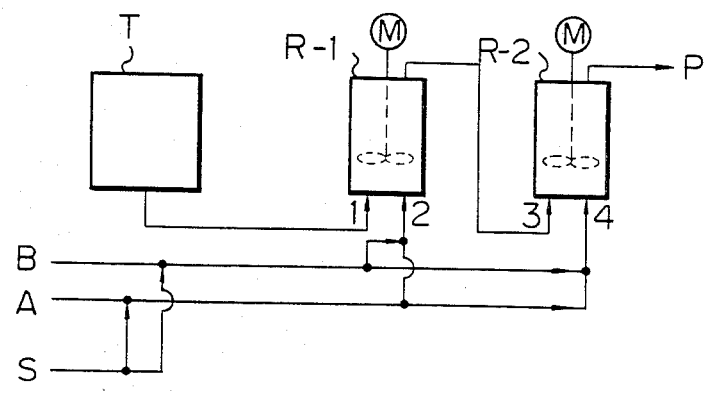
FIG. 1 is a flow sheet illustrating one example of the continuous polymerization process according to the present invention.

Referring to FIG. 1, a storage tank T for a prepolymer in the state of a living polymer and two polymerization vessels R-1 and R-2 are connected in series, and a conjugated diene B and/or an aromatic vinyl hydrocarbon monomer A and, if necessary, a solvent S are continuously supplied to the polymerization vessels R-1 and R-2 through pipe lines 2 and 4. The living polymer (prepolymer) formed in advance by polymerization is stored in the storage tank T. If necessary, the living polymer prepared in a separate polymerization system may be supplied to the storage tank T intermittently or continuously during the continuous polymerization. The prepolymer stored in the storage tank T is continuously supplied into the polymerization vessel R-1 through a pipe line 1. A polymer (living polymer) formed in the polymerization vessel R-1 is continuously supplied into the polymerization vessel R-2 through a pipe line 3. A block polymer P formed in the polymerization vessel R-2 is continuously withdrawn from the polymerization vessel R-2 and fed to a subsequent step, for example, an addition step of a stabilizer or the like to the polymer P, a solvent recovery step or the like. Thus, the desired block copolymer can be recovered.

Figure 2:
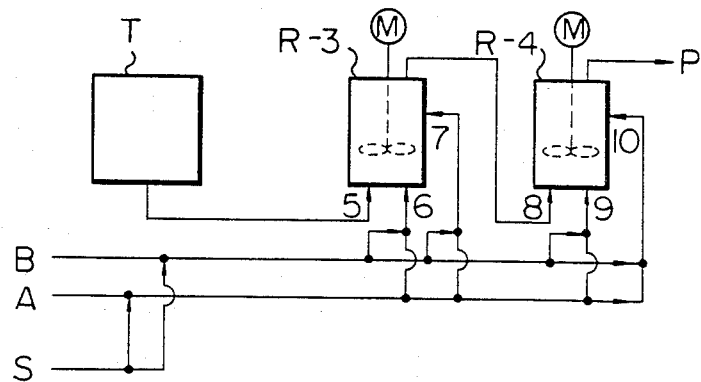
FIG. 2 is a flow sheet illustrating another example of the continuous polymerization process according to the present invention.

In an embodiment shown in FIG. 2, the conjugated diene B, aromatic vinyl hydrocarbon monomer A and, if necessary, the solvent S are continuously supplied into polymerization vessels disposed in the continuous polymerization zone (b) from supply inlets of the side faces of the polymerization vessels through pipe lines 7 and 10. In each of the polymerization vessels R-3 and R-4, a control is made so that polymerization of the monomer supplied through a pipe line 6 or 9 is substantially advanced in the region between the bottom of the polymerization vessel and the supply inlet of the side face, while the polymerization of the monomer supplied through a pipe line 7 or 10 is substantially advanced in the region between the head of the polymerization vessel and the supply inlet of the side face.

Figure 3:
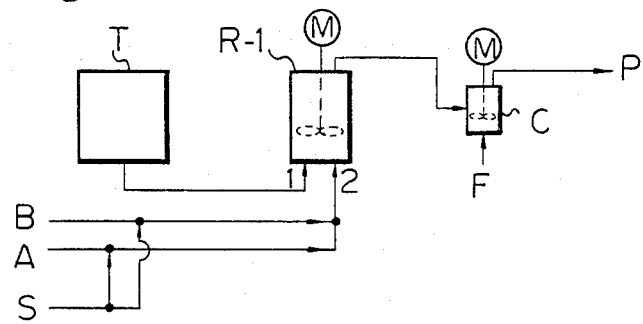
FIG. 3 is a flow sheet illustrating a further example of the continuous polymerization process according to the present invention.
Figure 4:
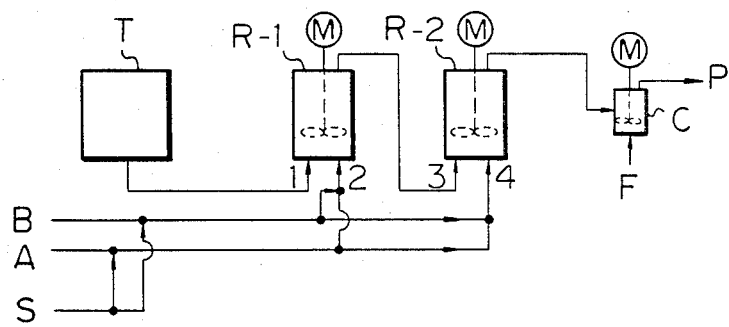
FIG. 4 is a flow sheet illustrating a still further example of the continuous polymerization process according to the present invention.
Figure 5:
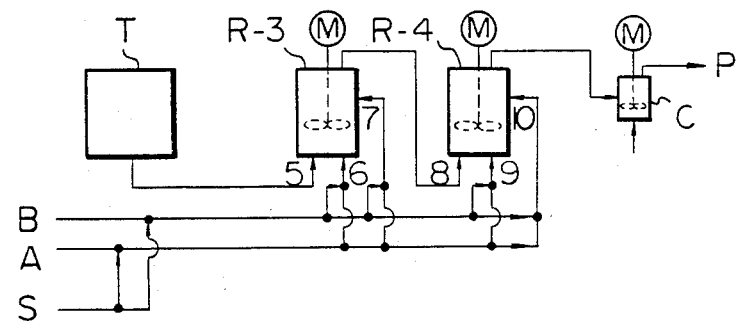
FIG. 5 is a flow sheet illustrating a still further example of the continuous polymerization process according to the present invention.

Referring to FIGS. 3, 4 and 5, the polymer (the living polymer) prepared, as mentioned above, in the continuous polymerization zone (b) is continuously withdrawn from the polymerization vessel R-1 (FIG. 3), R-2 (FIG. 4) or R-4 (FIG. 5) and supplied to a reaction vessel C, whereby the polymer is reacted with a polyfunctional compound F to form a block copolymer P having a radial block structure. The block copolymer P is then fed to a subsequent step, for example, an addition step of a stabilizer or the like to the polymer P, a solvent recovery step or the like. Thus, the desired block copolymer can be recovered.

It should be noted that the embodiments of the present invention are only illustrative and by no means limit the scope of the present invention.

As a method for recovering the block copolymer from the block copolymer solution obtained according to the process of the present invention, there can be adopted known methods such as a method in which a precipitating agent such as methanol is added to the copolymer solution and the precipitated block copolymer is recovered, a method in which the solution is heated to evaporate the solvent and the residual copolymer is recovered, and a method in which the block copolymer solution is dispersed in water, steam is blown into the dispersion to distill the solvent under heating and the residual copolymer is recovered.

Carboxyl groups, ester groups, nitrile groups, sulfonic acid groups and the like may be introduced into the block copolymer obtained according to the process of the present invention by hydrogenation, halogenation, halogenohydrogenation or other chemical reaction, whereby the block copolymer is modified. Furthermore, appropriate amounts of additives, for example, inorganic fillers such as calcium carbonate, magnesium carbonate, zinc oxide, titanium oxide, clay, talc, glass beads and glass fibers, organic reinforcers such as carbon black, organic fibers such as carbon fibers and synthetic fibers, tackifiers such as terpene resins and coumarone resins, crosslinking agents such as organic peroxides, inorganic peroxides and sulfur, oils such as paraffinic, naphthenic and aromatic oils, pigments, dyes, flame retardants, lubricants, plasticizers, extenders and mixtures thereof may be incorporated into the block copolymer obtained according to the process of the present invention.

As mentioned hereinabove, according to the process of the present invention, a block copolymer having excellent mechanical properties, especially tensile strength, can easily be prepared in a continuous manner. The process of the present invention is characterized in that (1) the allowance of the residence time in each polymerization vessel is large and therefore, the variability of the manufacturing rate is large, (2) the time required for arrival at the stationary state is very short and the loss at the initial stage of polymerization is remarkably reduced, and (3) a gelled polymer is not formed and continuous polymerization can stably be conducted for a long time.

Furthermore, although the block copolymer mixture of the present invention has a substantially single peak (monomodal type peak) of the molecular-weight distribution in total, the aromatic vinyl hydrocarbon contents of the block copolymers in the mixture are substantially changed with the increase in the molecular weight. Therefore, the mutual interaction of the block copolymers in the mixture becomes large and extremely effective synergistic effects can be obtained. For instance, an adhesive containing a compounded block copolymer mixture of the present invention has both excellent tackiness and excellent creep characteristics, which oppose each other. Furthermore, in the case where the block copolymer mixture of the present invention is compounded into polystyrene, a composition having a balanced transparency and impact strength can be obtained. In these points, the present block copolymer mixtures are clearly distinguished from the conventional block copolymer mixtures.

Furthermore, although the block copolymer mixture of the present invention contains block copolymers having different aromatic vinyl hydrocarbon contents and molecular weights, the mechanical properties, such as the tensile strength and the impact strength, of the block copolymer mixture of the present invention are excellent.

In addition, the conventional block copolymer mixtures require troublesome operations in the preparation thereof, because two or more types of block copolymers should be mixed together in a desired ratio after the desired two or more block copolymers will have been previously prepared. Contrary to this, according to the present invention, surprisingly, the block copolymer mixture containing the block copolymers having different aromatic vinyl contents (i.e. having a non-uniform composition distribution) can be readily and continuously prepared in a single polymerization process.

The block copolymer obtained according to the process of the present invention can widely be used in various fields by utilizing characteristics as the thermoplastic elastomer or characteristics as the thermoplastic resin. For example, the block copolymer obtained according to the process of the present invention can be used for manufacture of extrusion-molded articles such as rubber threads, hoses, window frames, sheets and films, molded articles obtained from extrusion sheets by heat molding such as vacuum molding or air-pressure forming, injection-molded articles such as clogs and vessels, blow-molded articles such as toys and household articles and compression-molded articles such as packing, sheets and plates. Furthermore, the block copolymer is used as an adhesive in the form of a solution, as a latex in the form of an aqueous dispersion and as a packaging material in the form of a film. Moreover, the block copolymer obtained according to the process of the present invention may be used as a modifier. For example, the block copolymer may be incorporated into a natural rubber or a synthetic rubber at an optional mixing ratio, and it may also be incorporated into a thermoplastic resin such as polyethylene, polypropylene, polystyrene, impact-resistant polystyrene, an acrylonitrile/butadiene/styrene copolymer or a mixture thereof.

The present invention now will be further illustrated, but by no means limited to the following Examples.

EXAMPLES 1 THROUGH 3 AND COMPARATIVE EXAMPLES 1 AND 2

Continuous polymerization was carried out in a continuous polymerization apparatus comprising two polymerization vessels connected in series as shown in the flow sheet of FIG. 1 by using a living polymer of polystyrene obtained in a cyclohexane solution in the presence of n-butyl lithium as a catalyst.

The living polymer of polystyrene was first prepared according to the following procedures.

A cyclohexane solution containing purified and dried styrene at a concentration of 20% by weight was charged in a polymerization vessel equipped with a stainless steel stirrer, the inner atmosphere of which was previously replaced with nitrogen gas. Then, n-butyl lithium was added as a catalyst and polymerization was carried out at 50° C. for 2 hours. The amount of the catalyst was adjusted so that the resulting polystyrene had the $\overline{Mn}$ shown in Table 1. The $\overline{Mw}/\overline{Mn}$ ratio of polystyrene obtained according to this method was about 1.15. When it was intended to obtain polystyrene having a broad molecular weight distribution, polymerization was conducted by adding the cyclohexane solution of styrene and the catalyst in a divided manner several times. Living polymers of polystyrene having an $\overline{Mw}/\overline{Mn}$ ratio shown in Table 1 were thus prepared. The polymerization vessel used for the preparation of the living polymer was directly used as the storage tank T at the subsequent step of continuous polymerization.

In the continuous polymerization step, a polymerization vessel provided with a stainless steel stirrer, which had an L/D ratio of about 12, was used as the polymerization vessel R-1, and a polymerization vessel having an L/D ratio of about 8 was used as the polymerization vessel R-2. The inner atmosphere of each polymerization vessel was replaced with nitrogen gas, and the temperature was then elevated to a predetermined level. The polystyrene living polymer and butadiene were continuously supplied into the polymerization vessel R-1 and styrene was continuously supplied into the polymerization vessel R-2, so that the living polymer/butadiene/styrene weight ratio was 15/70/15. Both butadiene and styrene were supplied in the form of a 20% by weight cyclohexane solution. The average residence times in the polymerization vessels R-1 and R-2 were about 45 minutes and about 35 minutes, respectively, and the polymerization temperatures in the vessels R-1 and R-2 were adjusted to, on average, about 90° C. and about 75° C., respectively. Polymerization was continuously carried out under these conditions. At the outlet of each polymerization vessel, the conversion of butadiene or styrene under the above conditions was about 95% or more.

Then, 0.5 part by weight each of di-tert-butyl-p-cresol and tris-nonylphenyl phosphite were added as stabilizers to the block copolymer solution withdrawn continuously from the polymerization vessel R-2 per 100 parts by weight of the block copolymer. The solvent was removed by heating and the block copolymer was recovered. The obtained block copolymer had a styrene content of about 29 to about 31% by weight, a block styrene content of about 28 to about 31% by weight and a melt flow index of about 4 to about 8 (as determined under condition G of ASTM D-1238-57T).

The physical properties of the obtained block copolymers are shown in Table 1. From the results shown in Table 1, it is apparent that if continous polymerization was carried out by using a living polymer of polystyrene in which $\overline{Mn}$ or $\overline{Mw}/\overline{Mn}$ was outside the range specified in the present invention, the tensile strength was drastically reduced.

In the continuous polymerization according to the process of the present invention, at the initial stage when the block copolymer solution began to come out from the outlet of the polymerization vessel R-2, the formed block copolymer had substantially desirable properties, and after about 30 minutes, the steady state was produced and a block copolymer having physical properties as shown in Table 1 could stably be prepared continuously.

When continous polymerization was conducted continously for 10 days according to the process of the present invention as in the foregoing Examples, the operation could be continued stably without any troubles such as clogging of pipe lines with a gelatinous substance and drastic variation of the physical properties.

minutes and the polymerization temperature in the vessel R-1 was adjusted to, on average, about 90° C. Thus, the continuous polymerization was carried out. The conversion of the butadiene under these conditions at the outlet of the polymerization vessel was about 98% or more.

The block copolymer continuously withdrawn from the reaction vessel R-1 was supplied, in the state of a living polymer, into a subsequent reaction vessel C, wherein the block polymer was reacted with a ½ equivalent, based on the active point of the living polymer, of dimethyldichlorosilane.

Then, 0.5 parts by weight each of di-tert-butyl-p-cresol and tris-nonylphenyl phosphite, based on 100 parts by weight of the block copolymer, were added as stabilizers to the block copolymer solution continously withdrawn from the reaction vessel C. The solvent was then removed from the polymerization mixture. Thus, the block copolymer was obtained. The styrene content of the block copolymer thus obtained was about 29 to about 31% by weight, the block styrene content about 28 to about 31% by weight and the melt flow index from about 4 to about 8.

TABLE 1

| Run No. | Prepolymer $\overline{Mn}$ | Prepolymer $\overline{Mw}/\overline{Mn}$ | Tensile Strength (Kg/cm$^2$) | Elongation (%) | 300% Tensile Modulus (Kg/cm$^2$) | Hardness (JIS) |
|---|---|---|---|---|---|---|
| Example 1 | 11,000 | 1.15 | 285 | 950 | 30 | 68 |
| Comparative Example 1 | 3,000 | 1.15 | 50 | 750 | 20 | 53 |
| Example 2 | 11,000 | 1.25 | 275 | 950 | 30 | 68 |
| Example 3 | 11,000 | 1.35 | 260 | 900 | 25 | 65 |
| Comparative Example 2 | 11,000 | 1.80 | 90 | 850 | 25 | 62 |

Note
The tensile strength, tensile stress at 300% elongation and hardness were measured according to JIS (Japanese Industrial Standard) K-6301.

EXAMPLES 4 THROUGH 6 AND COMPARATIVE EXAMPLES 3 AND 4

Continuous polymerization was carried out in a continuous polymerization apparatus as shown in FIG. 3 by using a living polymer of polystyrene obtained in a cyclohexane solution in the presence of n-butyl lithium catalyst. In the continuous polymerization step, a polymerization vessel equipped with a stainless steel stirrer and having an L/D ratio of about 12 was used as the polymerization vessel R-1.

The inner atmosphere of the reaction vessel R-1 was previously replaced with nitrogen gas and the temperature was raised to a predetermined level. The polystyrene living polymer prepared in a manner as described in Examples 1 through 3, and butadiene were continuously supplied into the polymerization vessel R-1 at a weight ratio of the living polymer/butadiene of 30/70. The butadiene was supplied in the form of a 20% by weight cyclohexane solution. The average residence time in the polymerization vessel R-1 was about 45

The physical properties of the resultant block copolymers are shown in Table 2 below. From the results shown in Table 2, it is clear that the block copolymer continuously polymerized by using the polystyrene living polymer, as a prepolymer, of which $\overline{Mn}$ or $\overline{Mw}/\overline{Mn}$ is out of the range of the present invention, had an extremely low tensile strength.

In the continuous polymerization according to the present invention, at the relatively initial stage when the block copolymer solution began to come out from the outlet of the reaction vessel C, a block copolymer having substantially desired properties was obtained, and after about 45 minutes, the steady state was produced and a block copolymer having physical properties as shown in Table 2 was stably and continuously obtained. Furthermore, a long term continuous operation could be continued stably as in Examples 1 through 3.

TABLE 2

| Run No. | Prepolymer $\overline{Mn}$ | Prepolymer $\overline{Mw}/\overline{Mn}$ | Tensile Strength (Kg/cm$^2$) | Elongation (%) | 300% Tensile Modulus (Kg/cm$^2$) | Hardness (JIS) |
|---|---|---|---|---|---|---|
| Example 4 | 11,000 | 1.15 | 270 | 950 | 30 | 68 |
| Comparative Example 3 | 3,000 | 1.15 | 40 | 750 | 15 | 53 |
| Example 5 | 11,000 | 1.25 | 250 | 950 | 27 | 68 |
| Example 6 | 11,000 | 1.35 | 240 | 900 | 23 | 65 |
| Comparative Example 4 | 11,000 | 1.80 | 80 | 850 | 20 | 62 |

EXAMPLES 7 AND 8 AND COMPARATIVE EXAMPLE 5

Continuous polymerization was carried out in a continuous polymerization apparatus as shown in the flow sheet of FIG. 1 by using a living polymer of a block copolymer comprising a polybutadiene block and a polystyrene block, which was obtained in n-hexane in the presence of a n-butyl lithium catalyst.

The living polymer was prepared according to the following procedures.

A n-hexane solution containing purified and dried butadiene at a concentration of 20% by weight was charged in a polymerization vessel equipped with a stainless steel stirrer, the inner atmosphere of which was previously replaced with nitrogen gas, and n-butyl lithium was added as a catalyst and polymerization was carried out at 70° C. for 90 minutes. Then, a n-hexane solution containing styrene at a concentration of 20% by weight was added and polymerization was further conducted at 50° C. for 2 hours. The amounts added of the monomers and catalyst were adjusted so that the molecular weight and styrene content of the polystyrene block of the block copolymer were as shown in Table 3.

Continuous polymerization was carried out by using the same polymerization vessels as used in Example 1. Each of butadiene and styrene as the monomers was supplied in the form of a n-hexane solution having a concentration of 20% by weight, and continuous polymerization was conducted in the same manner as described in Example 1, except that the ratio of the monomers to be supplied into the polymerization vessels was changed as shown in Table 2. The obtained final block copolymer had a styrene content of about 39 to about 41% by weight, a block styrene content of about 38 to about 41% by weight and a melt flow index of 8 to 12.

For comparison, continuous polymerization was carried out in the same manner as described above, except that a living polymer of a random copolymer having a styrene content of 31% by weight was used instead of the living polymer of the block copolymer having a styrene content of 31% by weight (Comparative Example 3). A block copolymer having an excellent tensile strength in the unvulcanized state could not be obtained.

10% by weight n-hexane solution having a weight ratio of styrene/butadiene of 25/75.

As a result, a mixture of a random copolymer of styrene and butadiene and unreacted monomers was obtained from the prepolymerization, and the polymer finally obtained through the tubular-type polymerization vessel was a block-copolymer which had a styrene content of about 24 to about 26% by weight, the block styrene content being about 10 to about 12% by weight. The tensile strength of the block copolymer was 8 kg/cm$^2$ and the elongation was 250%. Thus, the tensile strength of the block polymer was poor in an unvulcanized state.

EXAMPLE 9, 10 AND COMPARATIVE EXAMPLE 7

Continuous polymerization was carried out in a continuous polymerization apparatus as shown in FIG. 3 by using a living block copolymer comprising a polybutadiene block and a polystyrene block in an n-hexane solution in the presence of n-butyl lithium. The polymerization vessels used in the continuous polymerization step were the same as those used in Example 4. The living block copolymer prepared in the same manner as described in Examples 7 and 8 was used as a prepolymer and the butadiene was supplied as a 20% by weight hexane solution.

The weight ratio of the prepolymer and the butadiene supplied into the polymerization vessel was as shown in Table 4, and the continuous polymerization was carried out in a manner as described in Example 4, except that tetrachloro-silane was used as the polyfunctional compound in the reaction vessel C in an amount of a one-fourth equivalent, based on the active point of the living polymer. The styrene content and the block styrene content of the block copolymer finally obtained were similar to those of Example 4. The melt index was 0.5 to 2.

As a Comparative Example, the above continuous polymerization was repeated, except that a random living copolymer having a styrene content of 38% by weight was used in lieu of the living block copolymer having a styrene content of 38% by weight. However, a block copolymer having an excellent tensile strength in an unvulcanized state could not be obtained.

TABLE 3

| Run No. | Weight Ratio of Components Supplied to Polymerization Vessels | | | Prepolymer | | | Tensile Strength (Kg/cm$^2$) | Elongation (%) | 300% Tensile Modulus (Kg/cm$^2$) | Hardness (JIS) |
|---|---|---|---|---|---|---|---|---|---|---|
| | R-1 Prepolymer | R-1 Butadiene | R-2 Styrene | Bound Styrene (wt. %) | Polystyrene Block Mn | Polystyrene Block Mw/Mn | | | | |
| Example 4 | 32 | 48 | 20 | 62.5 | 13,000 | 1.25 | 180 | 1150 | 25 | 87 |
| Example 5 | 65 | 15 | 20 | 31 | 12,000 | 1.25 | 115 | 900 | 25 | 85 |
| Comparative Example 3 | 65 | 15 | 20 | 31 | — | — | 30 | 800 | 15 | 70 |

COMPARATIVE EXAMPLE 6

Continuous polymerization was carried out in a manner as described in U.S. Pat. No. 3,356,763 in a n-hexane solution in the presence of an n-butyl lithium catalyst. Continuous polymerization vessels including a prepolymerization vessel and polymerization vessels connected in series similar to those as used in Example 1 of the U.S. Patent were used. The continuous polymerization was carried out in the same manner as in Example 1, except that the monomers supplied into the polymerization vessels were diluted with n-hexane to form a

EXAMPLE 11

The continuous polymerization reaction of Example 4 was repeated, except that the weight ratio of the prepolymer and the butadiene supplied into the polymerization vessel was changed as shown in Table 4 and tetrachlorosilane was used, as a polyfunctional compound, in an amount of a one-fourth equivalent of the active point of the living polymer.

The block copolymer finally obtained had a styrene content of about 39 to about 41% by weight, a block styrene content of about 38 to 41% by weight and a melt flow index of 4 to 8. The physical properties of the resultant block copolymer are as shown in Table 4.

ing an opening area of about 30% were equidistantly arranged in the polymerization vessel.

The block copolymer finally obtained had a styrene content of about 39 to 41% by weight and a block styrene content of about 35 to 40% by weight. Furthermore, the tensile strength of the resultant block copolymer was 290 kg/cm$^2$, the elongation 850%, the 300% tensile modulus 35 kg/cm$^2$ and the hardness 90.

TABLE 4

| Run No. | Weight Ratio of Prepolymer and Butadiene Supplied into Polymerization Vessels | | Prepolymer | | | Tensile Strength (Kg/cm$^2$) | Elongation (%) | 300% Tensile Modulus (Kg/cm$^2$) | Hardness (JIS) |
|---|---|---|---|---|---|---|---|---|---|
| | Prepolymer | Butadiene | Bound Styrene (wt. %) | Polystyrene Block Mn | Mw/Mn | | | | |
| Example 9 | 48 | 52 | 62.5 | 10,000 | 1.25 | 155 | 950 | 20 | 65 |
| Example 10 | 79 | 21 | 38 | 10,000 | 1.25 | 100 | 800 | 20 | 63 |
| Comparative Example 7 | 79 | 21 | 38 | — | — | 20 | 700 | 10 | 57 |
| Example 11 | 40 | 60 | 100 | 12,000 | 1.15 | 280 | 750 | 50 | 90 |

EXAMPLE 12

A living polymer of polystyrene obtained in the same manner as described in Example 1 and a cyclohexane solution containing butadiene having a concentration of about 20% by weight were continuously supplied into the bottom portion of a polymerization vessel equipped with a stainless steel stirrer, which had an L/D ratio of about 20, and a cyclohexane solution containing styrene at a concentration of 20% by weight was supplied into the polymerization vessel from a supply inlet disposed at a position of ¾L from the bottom. Thus, continuous polymerization was carried out. The living polymer, butadiene and styrene were continuously supplied in a weight ratio of 20/60/20, respectively, so that the average residence time in the polymerization vessel was about 30 minutes. In the region of from the bottom to the styrene supply inlet, the polymerization temperature was about 90° C. on average, and in the region of from the styrene supply inlet to the head of the polymerization vessel, the polymerization vessel was about 80° C. on average.

In order to polymerize butadiene supplied from the bottom of the polymerization vessel and styrene supplied from the side of the polymerization vessel in different regions and narrow the molecular weight distribution in each polymer block, three grating plates having an opening area of about 30% were equidistantly arranged in the polymerization vessel.

EXAMPLES 13 AND 14

Continuous polymerization was carried out in the same manner as described in Example 12, except that instead of the living polymer of polystyrene used in Example 12, a living polymer of a block copolymer prepared according to the method described in Example 7 was used. The polymerization conditions are shown in Table 5 below. Each of butadiene and styrene supplied to the polymerization vessel was used in the form of an n-hexane solution having a concentration of 20% by weight. The average residence time in the polymerization vessel was about 30 minutes. The results are shown in Table 5.

TABLE 5

| | Weight Ratio of Components Supplied to Polymerization Vessel | | | Polymerization Temperature (°C.) | | | | | | |
|---|---|---|---|---|---|---|---|---|---|---|
| | Bottom Inlet | | Intermediate Inlet | Bottom to Intermediate Inlet | Intermediate Inlet to Head | Bound Styrene (wt. %) | Block Styrene (wt. %) | Melt Flow Index (g/10 minutes) | Tensile Strength (Kg/cm$^2$) | Elongation (%) |
| Run No. | Prepolymer | Butadiene | Styrene | | | | | | | |
| Example 7 | 32 | 38 | 30 | 85 | 80 | 49–51 | 40–45 | 10–15 | 150 | 950 |
| Example 8 | 32 | 23 | 45 | 80 | 85 | 64–66 | 55–60 | 3–7 | 130 | >400 |

Note
The tensile characteristics of the block copolymer obtained in Example 8 were measured according to JIS K-6871.

EXAMPLES 15, 16 AND 17

Block copolymers were prepared by performing continuous polymerization as described in Examples 1, 4 and 6, respectively. The results are shown in Table 6.

EXAMPLES 18 AND 19

The block copolymers having a styrene content of 73% by weight and 80% by weight were continuously polymerized in a manner as described in Example 11.

TABLE 6

| Run No. | Polymerization Mode | Weight Ratio of Components Supplied to Polymerization Vessels | | | Bound Styrene (wt. %) | Block Styrene (wt. %) | Melt Flow Index (g/10 minutes) | Tensile Strength (kg/cm$^2$) | Elongation (%) | Izod Impact Strength (Kg · cm/cm-notch) |
|---|---|---|---|---|---|---|---|---|---|---|
| | | Prepolymer | Butadiene | Styrene | | | | | | |
| Example 15 | same as in Example 7 | 32 | 23 | 45 | 64–66 | 63–66 | 3–7 | 150 | >400 | not broken |
| Example 16 | same as in Example 1 | 35 | 30 | 35 | 69–71 | 68–71 | 3–7 | 195 | 300 | 50 |
| Example 17 | same as in | 30 | 20 | 50 | 79–81 | 70–75 | 1–5 | 270 | 50 | 3.5 |

TABLE 6-continued

| Run No. | Polymerization Mode | Weight Ratio of Components Supplied to Polymerization Vessels | | | Bound Styrene (wt. %) | Block Styrene (wt. %) | Melt Flow Index (g/10 minutes) | Tensile Strength (kg/cm²) | Elongation (%) | Izod Impact Strength (Kg · cm/cm-notch) |
|---|---|---|---|---|---|---|---|---|---|---|
| | | Prepolymer | Butadiene | Styrene | | | | | | |
| | Example 12 | | | | | | | | | |

Note
Physical properties of the block copolymers obtained in Examples were measured according to JIS K-6871.

TABLE 7

| Run No. | Bound Styrene (wt. %) | Block Styrene (wt. %) | Melt Flow (g/10 minutes) | Tensile Strength (Kg/cm²) | Elongation (%) | Izod Impact Strength (Kg · cm/cm with notch) |
|---|---|---|---|---|---|---|
| Example 18 | 72–74 | 71–74 | 2–6 | 200 | 250 | 4.5 |
| Example 19 | 79–81 | 78–81 | 3–7 | 270 | 15 | 2.0 |

(Note)
The physical properties listed above were measured according to JIS-K-6871.

EXAMPLE 20

A self-cleaning type polymerization vessel having an L/D ratio of about 30 and being provided with two screw type stirrers was used as the polymerization vessel in the continuous polymerization zone, and solvent-free continuous polymerization was carried out without diluting the monomers to be supplied to the continuous polymerization step with a solvent.

A living polymer of polystyrene prepared in the same manner as described in Example 1, except that a cyclohexane solution containing styrene at a concentration of 50% by weight, butadiene and a portion of styrene were supplied into the self-cleaning type polymerization vessel from the bottom thereof, and the remainder of styrene was supplied into the polymerization vessel from a supply inlet disposed at a position of about 3/5 L from the bottom, so that the weight ratio of these components was 30/20/15/35. These components were continuously supplied at the above weight ratio so that the average residence time was about 20 minutes. The polymerization temperature was about 80° C. on the average in the region of from the bottom of the polymerization vessel to the intermediate styrene supply inlet and about 110° C. on average in the subsequent region.

The obtained final block copolymer having a styrene content of 80% by weight had the physical properties substantially equal to those of the block copolymer obtained in Example 17.

EXAMPLE 21 AND COMPARATIVE EXAMPLES 8, 9

The continuous polymerization was carried out in a continuous polymerization apparatus as shown in a flow sheet of FIG. 1 by using, as a prepolymer, the block copolymer of a polybutadiene block and a polystyrene block used in Example 7. Thus, a block copolymer mixture was obtained as follows.

In the continuous polymerization zone, a polymerization vessel having an L/D ratio of about 4 and equipped with a stainless steel stirrer was used as the polymerization vessel R-1 and a polymerization vessel having an L/D ratio of about 8 was used as the polymerization vessel R-2. The inner atmosphere of each polymerization vessel was replaced with nitrogen gas, and the temperature was then raised to a predetermined level. Thereafter, the above-mentioned living polymer and butadiene were continuously supplied to the polymerization vessel R-1 and styrene was continuously supplied to the polymerization vessel R-2. The weight ratio of the living polymer/butadiene/styrene supplied was 32/48/20, respectively. The butadiene and the styrene were supplied in the form of a 20% by weight n-hexane solution. The continuous polymerization was carried out under such conditions that the average residence times in the vessels R-1 and R-2 were about 45 minutes and about 35 minutes, respectively and that the polymerization temperatures in the vessels R-1 and R-2 are adjusted to about 90° C. and about 75° C., respectively. The conversions of butadiene and styrene at the outlet of the polymerization vessel were both about 95% or more.

To the block copolymer mixture solution continuously withdrawn from the polymerization vessel R-2, 0.5 parts by weight each of di-tert.-butyl-p-cresol and tris-nonylphenyl phosphite were added as a stabilizer. The solvent was removed from the resultant solution by heating, whereby the block copolymer mixture was obtained. The styrene content of the resultant block copolymer mixture was about 39 to about 41% by weight, the block styrene content about 38 to about 41% by weight and the melt flow index (ASTM D-1238-57T, condition G) 8 to 12. The physical properties of the block copolymer mixture thus obtained are shown in FIG. 8.

Figure 6:
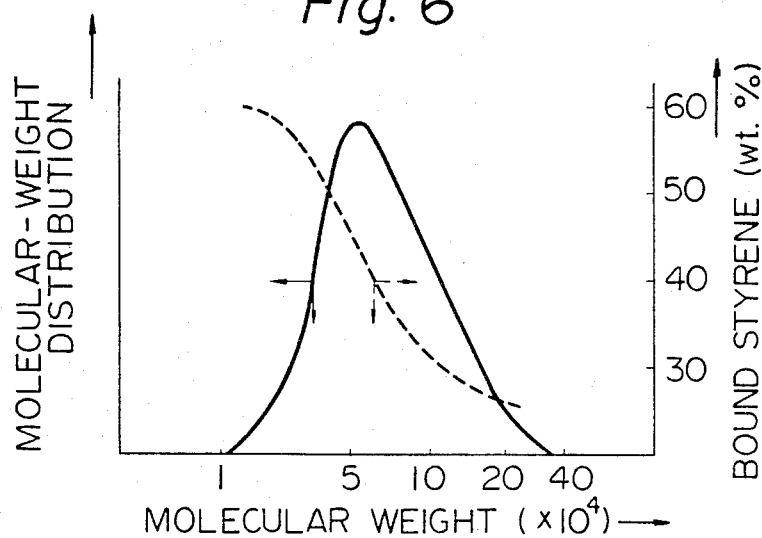
FIG. 6 is a graphical drawing illustrating the molecular-weight distribution (solid line) and the correlation between the molecular weight and the bound styrene content (dotted line) of the block copolymer mixture of Example 21.

As shown in FIG. 6, although the molecular-weight distribution of the block copolymer mixture obtained above was a single peak (a monomodal peak) (see the solid line), the styrene content (i.e. bound styrene) of the block copolymer was decreased with the increase in the molecular weight as shown by the dotted line curve of FIG. 6. The composition distribution of the block copolymer shown in FIG. 6 was obtained by determining the molecular-weight distribution according to a GPC method and simultaneously determining the differential styrene content of each developed liquid (5 ml). The GPC used in the determination was Model LC-1 available from Shimazu Seisakusho, to which a differential refractometer and an ultraviolet absorption spectrophotometer were connected. The determination was carried out under the following conditions.

(a) Column HSG: 40, 50, 60
 (b) Developing Solution: Tetrahydrofuran
 (c) Temperature: 40° C.

As Comparative Example 8, a block copolymer having a styrene content of about 40% by weight, a block styrene content of about 38% by weight and a melt flow index of about 10 was prepared in a conventional batchwise polymerization method as follows.

The inner atmosphere of a flushed and dried polymerization vessel was replaced with nitrogen gas. To the polymerization vessel, 12 parts by weight of butadiene in the form of a 20% by weight n-hexane solution and 0.11 parts by weight of n-butyl lithium were added and the polymerization was effected at a temperature of 70° C. for 60 minutes. Thereafter, 20 parts by weight of styrene, 48 parts by weight of butadiene and 20 parts by weight of styrene, each in the form of a 20% by weight n-hexane solution were successively added. After the addition of each monomer, the polymerization was carried out at a temperature of 70° C. for 60 minutes. The post-treatment of the resultant block copolymer was carried out in a manner as described in Example 21.

Figure 7:
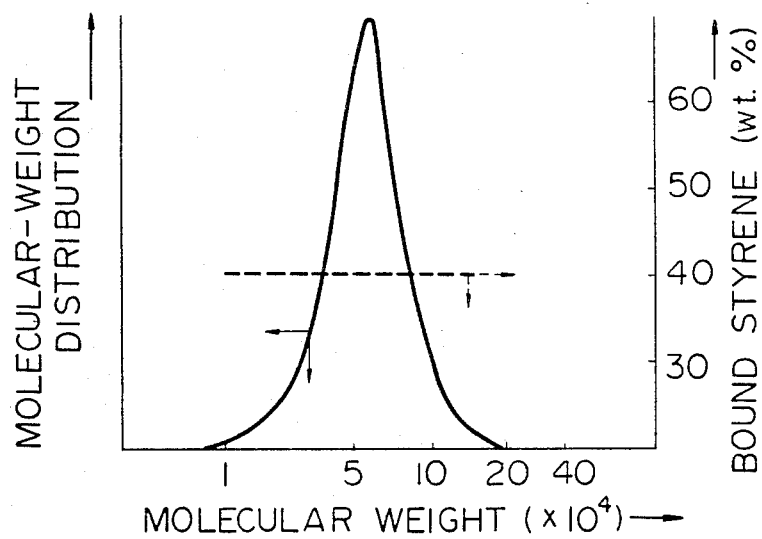
FIG. 7 is a graphical drawing illustrating the molecular-weight distribution (solid line) and the correlation between the molecular weight and the bound styrene content (dotted line) of the block copolymer mixture of Comparative Example 8 obtained from the conventional batchwise polymerization method.

The physical properties of the block copolymer thus obtained are shown in Table 8 below and the molecular-weight distribution and the composition distribution are shown in FIG. 7.

TABLE 8

| Run No. | Tensile Strength (Kg/cm$^2$) | Elongation (%) | 300% Tensile Modulus (Kg/cm$^2$) | Hardness (JIS) |
|---|---|---|---|---|
| Example 21 | 180 | 1100 | 28 | 90 |
| Comparative Example 8 | 180 | 1150 | 25 | 87 |

As is clear from the results shown in Table 8, the physical properties of the block copolymer mixture of Example 21 are comparable to those of the block copolymer of Comparative Example 8, although the composition distribution of the block copolymer mixture of Example 21 according to the present invention is very broad. It is worth noting that this fact is contrary to the conventional fundamental idea in the art that both the molecular-weight distribution and the composition distribution should be made uniform as much as possible in order to obtain a block copolymer having excellent physical properties, especially excellent tensile strength and impact strength.

In the continuous polymerization according to the present invention, at the relatively initial stage when the block copolymer mixture solution began to come out from the outlet of the polymerization vessel R-2, the block copolymer mixture having substantially desired properties was obtained, and after about 30 minutes, the steady state was produced and a block copolymer having physical properties as shown in Table 8 was stably and continuously obtained. In addition, after the continuous polymerization operation of the present invention was continued for 10 days, stable operation could be effected without causing any problems such as clogging of the pipe lines and other equipment due to the formation of gel materials, and the desired physical properties were largely unchanged.

Furthermore, in order to clarify the fact that the block copolymer mixture of Example 21 obtained above has excellent characteristics as compared with the block copolymer mixture obtained from the conventional method, the following adhesiveness test was carried out. As the conventional block copolymer mixture, a block copolymer mixture having a styrene content of about 40% by weight, a block styrene content of about 38% by weight and a melt flow index of about 10 was prepared by blending equal amounts of the block copolymers having styrene contents of 25% by weight and 55% by weight obtained in the same manner as described in Comparative Example 8. The resultant block copolymer mixture is referred to as a sample of Comparative Example 9.

An adhesive mass used in the adhesiveness test was prepared by mixing 100 parts by weight of the block copolymer mixture sample, 100 parts by weight of terpene resin, 30 parts by weight of naphthenic oil and, as a stabilizer, 3 parts by weight of 2,5-di-tert-butylhydroquinone, followed by heating at a temperature of about 180° C. to be melted. The molten adhesive mass thus obtained was coated at a temperature of about 170° C. onto a craft board of which the back surface had been treated with an applicator. The tack and the creep characteristics to a stainless steel were determined with respect to the craft adhesive tape obtained above. The determination methods were as follows.

(1) The tack was determined by first fixing an adhesive tape sample to be tested on a plate having an inclination angle of 30° and, then, rolling over balls on the surface of the adhesive tape sample having a length of 100 mm and a width of 50 mm according to a ball rolling method of J. Dow (JIS-Z-0237). The number of the balls stuck or adhered on to the surface of the adhesive tape was counted. The determination temperature was 20° C.

(2) The creep characteristics were determined by bonding an adhesive tape sample to be tested and a stainless steel plate in such a state that the bonding area was 250×25 mm and, then, loading a 1 kg weight on the underneath adhesive tape layer, while the upper side stainless steel plate was fixed. Thus, the time necessary for the adhesive tape to separate from the stainless steel plate at an ambient temperature of 60° C. was determined.

As a result, the adhesive mass into which the block copolymer mixture obtained from the present process was compounded had a tack of 22 and creep characteristics of 30 minutes. Contrary to this, the adhesive mass into which the conventional block copolymer mixture was compounded had a tack of 18 and creep characteristics of 20 minutes. Thus, the excellent characteristics of the adhesive mass in which the block copolymer mixture of the present invention was contained were clearly observed, as compared with the conventional block copolymer mixture.

In addition, the adhesive mass into which one of the block copolymers of Comparative Example 8 was compounded, in lieu of the block copolymer mixture, had a tack of 16 and creep characteristics of 10 minutes.

EXAMPLE 22

Continuous polymerization was carried out by using, as a prepolymer, the polystyrene living polymer used in Example 1 in a single polymerization vessel having an L/D ratio of about 6 and equipped with a stainless steel stirrer as follows.

The living polystyrene and the butadiene in the form of a 20% by weight cyclohexane solution were continuously supplied into the polymerization vessel from the bottom thereof, and styrene in the form of 20% by weight cyclohexane solution was also continuously supplied into the polymerization vessel from a supply inlet at a position of ¾ L from the bottom. The living polymer, butadiene and styrene were continuously supplied at a weight ratio of 20/60/20, respectively, in such a manner that the average residence time in the polymerization vessel was about 30 minutes. The polymerization temperature in a zone from the bottom to the styrene inlet was adjusted to about 90° C. and the temperature in a zone from the styrene inlet to the top of the polymerization vessel was adjusted to about 80° C. In addition, in this Example, two grating plates each having an opening area of about 30% were arranged in the polymerization vessel at the levels of ½ L and ¾ L from the bottom, in order to polymerize butadiene supplied from the bottom and styrene supplied from the side of the polymerization vessel in different regions.

The block copolymer mixture thus obtained had a styrene content of about 39 to 41% by weight, a block styrene content of about 33 to 38% by weight, a melt flow index of 2 to 6, a tensile strength of 270 kg/cm$^2$, an elongation of 1000%, a 300% tensile modulus of 30 kg/cm$^2$ and a hardness of 85.

Furthermore, the molecular-weight distribution and the composition distribution were similar to those of Example 21.

EXAMPLE 23 AND 24

A block copolymer mixture (Example 23) having a styrene content of about 70% by weight and a block copolymer mixture (Example 24) having a styrene content of about 80% by weight were prepared as described in Examples 21 and 22 respectively. In Example 23, a mixed solvent of n-hexane/cyclohexane of 70/30 (weight ratio) was used as the polymerization solvent.

The physical properties of the block copolymer mixtures are shown in Table 9 below. The block copolymer mixtures had a single peak of (i.e. monomodal type) molecular-weight distributions, but had very broad composition distributions. The molecular-weight distribution and the composition distribution are shown in FIG. 8.

a 20% by weight n-hexane solution. The average residence time was adjusted to about 40 minutes and the polymerization temperature was adjusted to about 70° C. on average.

The resultant block copolymer mixture had a styrene content of about 49 to 51% by weight, a block styrene content of about 49 to 51% by weight and a melt flow index of 10 to 15. In addition, the molecular-weight distribution and the composition distribution were as shown in FIG. 9.

We claim:

1. A process for continuously preparing a block copolymer comprising at least two polymer blocks composed mainly of an aromatic vinyl hydrocarbon and at least one polymer block composed mainly of a conjugated diene in an inert hydrocarbon solvent composed mainly of an aromatic hydrocarbon or alicyclic hydrocarbon comprising the steps of:
  (a) batchwise preparing a prepolymer containing at least one aromatic vinyl hydrocarbon polymer block having a number-average molecular weight of at least 5000 and a weight-average molecular weight to number-average molecular weight ratio of less than 1.5 by using a portion of monomers to be formed into the block copolymer in the presence of an organic lithium compound as a catalyst; and, then,
  (b) continuously preparing the block copolymer in at least one polymerization vessel, arranged in a continuous polymerization zone for continuously polymerizing the remainder of the monomers, by continuously supplying the prepolymer to the first polymerization vessel and simultaneously supplying the remainder of the monomers in the form of at least one monomer group selected from the group consisting of a monomer group composed

TABLE 9

| Run No. | Styrene Content of Prepolymer (wt. %) | Weight Ratio of Components Supplied to Polymerization Vessel | | | Bound Styrene (wt. %) | Block Styrene (wt. %) | Melt Flow Index (g/10 minutes) | Tensile Strength (Kg/cm$^2$) | Elongation (%) | Izod Impact Strength (Kg · cm/cm with notch) |
| --- | --- | --- | --- | --- | --- | --- | --- | --- | --- | --- |
| | | Prepolymer | Butadiene | Styrene | | | | | | |
| Example 23 | 62.5 | 24 | 21 | 55 | 69–71 | 67–71 | 3–7 | 185 | 250 | 40 |
| Example 24 | 100 | 30 | 20 | 50 | 79–81 | 77–81 | 1–5 | 270 | 25 | 2.2 |

(Note)
The physical properties were determined according to JIS-K6871.

EXAMPLE 25

The block copolymer mixture was prepared in a manner similar to that of Example 4, except that a polymerization vessel having an L/D ratio of 4 was used in a continuous polymerization zone and tetrachloro-silane was used as a polyfunctional coupling agent in the reaction vessel C.

The physical properties of the block copolymer mixture thus obtained were similar to those of Example 4, but the composition distribution was such that the styrene contents were decreased with the increase in the molecular weights.

EXAMPLE 26

A living polymer of a block copolymer of a polybutadiene block—a polystyrene block—a polybutadiene block, having a styrene content of 28.6% by weight, prepared in a manner as described in Example 7 and styrene were continuously supplied, at a weight ratio of 70/30, to a polymerization vessel R-1 having an L/D ratio of about 4. The styrene was supplied in the form of mainly of the aromatic vinyl hydrocarbon and a monomer group composed mainly of the conjugated diene continuously and separately, to the subsequent polymerization vessel or vessels.

2. A process as claimed in claim 1, wherein the remainder of the monomer is continuously and separately supplied as a monomer group composed mainly of the aromatic vinyl hydrocarbon and a monomer group composed mainly of the conjugated diene, or is continuously supplied as a monomer group composed mainly of the conjugated diene, in the continuous polymerization zone (b).

3. A process as claimed in claim 1, wherein the continuous polymerization in the continuous polymerization zone (b) is carried out under such conditions that at least one aromatic vinyl hydrocarbon polymer block having a number-average molecular weight of at least 5000 and a weight-average molecular weight to number-average molecular weight ratio of less than 1.5 is formed.

4. A process as claimed in claim 1, wherein the block copolymer formed in the continuous polymerization zone (b) is further reacted with a polyfunctional compound in the state of a living polymer.

5. A process as claimed in claim 1, wherein the prepolymer is a living homopolymer of the aromatic vinyl hydrocarbon or a living copolymer having an aromatic vinyl hydrocarbon content of at least 40% by weight.

6. A process as claimed in claim 5, wherein the prepolymer is a living homopolymer of the aromatic vinyl hydrocarbon.

7. A process as claimed in claim 5, wherein the prepolymer is a living block copolymer comprising one polymer block composed mainly of the conjugated diene and one polymer block composed mainly of the aromatic vinyl hydrocarbon.

8. A process as claimed in claim 7, wherein the prepolymer is a living block copolymer having an aromatic vinyl hydrocarbon content of more than 60% by weight.

9. A process as claimed in claim 1, wherein, in the continuous polymerization zone (b), a monomer composed mainly of the conjugated diene is continuously supplied to the odd-numbered polymerization vessel of at least two polymerization vessels connected in series and polymerized therein, and the living polymer obtained in the odd-numbered polymerization vessel is continuously supplied into the even-numbered polymerization vessel and simultaneously, a monomer composed mainly of the aromatic vinyl hydrocarbon is continuously supplied into the even-numbered polymerization vessel and polymerized therein.

10. A process as claimed in claim 9, wherein the living polymer of the aromatic vinyl hydrocarbon obtained in the batchwise polymerization zone (a) or a living block copolymer comprising one polymer block composed mainly of the conjugated diene and one polymer block composed mainly of the aromatic vinyl hydrocarbon is continuously supplied, as the prepolymer, to the first reactor in the continuous polymerization zone (b), while a monomer composed mainly of the conjugated diene is simultaneously and continuously supplied to the first reactor and polymerized therein, and the living polymer obtained in the first reactor is continuously supplied into the second reactor and simultaneously the monomer composed mainly of the aromatic vinyl hydrocarbon is continuously supplied to the second reactor and polymerized therein.

11. A process as claimed in claim 1, wherein, in the continuous polymerization zone (b), at least one monomer selected from the group consisting of a monomer composed mainly of the vinyl aromatic hydrocarbon and a monomer composed mainly of the conjugated diene is supplied into at least one polymerization vessel separately from at least two supply inlets of said polymerization vessel.

12. A process as claimed in claim 11, wherein one polymerization vessel is used in the continuous polymerization zone (b), a monomer composed mainly of the conjugated diene is continuously supplied to said polymerization vessel from the bottom thereof and simultaneously, a monomer composed mainly of the vinyl aromatic hydrocarbon is continuously supplied into said polymerization vessel from at least one supply inlet formed on the side portion of the polymerization vessel.

13. A process as claimed in claim 12, wherein the living polymer of the aromatic vinyl hydrocarbon obtained in the batchwise polymerization zone (a) or a living block copolymer comprising one polymer block composed mainly of the conjugated diene and one polymer block composed mainly of the aromatic vinyl hydrocarbon is continuously supplied, as the prepolymer, into one polymerization vessel from the bottom thereof, while a monomer composed mainly of the conjugated diene is continuously supplied into said one polymerization vessel from the bottom thereof and simultaneously a monomer composed mainly of the aromatic vinyl hydrocarbon is continuously supplied into said polymerization vessel from at least one supply inlet formed on the side portion of said polymerization vessel.

14. A process as claimed in claim 4, wherein the living polymer of the aromatic vinyl hydrocarbon obtained in the batchwise polymerization zone (a) or a living block copolymer comprising one polymer block composed mainly of the conjugated diene and one polymer block composed mainly of the aromatic vinyl hydrocarbon is continuously supplied, as the prepolymer, into one polymerization vessel from the bottom thereof, while a monomer composed mainly of the conjugated diene is further continuously supplied into said one polymerization vessel from the bottom thereof.

15. A process as claimed in claim 1, wherein a solvent composed mainly of an aliphatic hydrocarbon is used as the polymerization solvent in the continuous polymerization zone (b) and the aromatic vinyl hydrocarbon content in the polymer formed in each polymerization vessel is about 75% by weight or less.

16. A process as claimed in claim 1, wherein a polymerization vessel having an L/D ratio of more than 7 in which L stands for the length of the polymerization vessel and D stands for the inner diameter of the polymerization vessel is used in the continuous polymerization zone (b).

17. A process as claimed in claim 1, wherein a polymerization vessel having an L/D ratio of at least about 10 is used as the polymerization vessel into which a monomer composed mainly of the vinyl aromatic hydrocarbon and a monomer composed mainly of the conjugated diene are supplied from at least two supply inlets.

18. A process as claimed in claim 1, wherein the weight ratio of the amount of the monomers to be formed into the prepolymer to the amount of the monomers to be continuously polymerized in the continuous polymerization zone (b) is in the range of from 5/95 to 90/10.

19. A process as claimed in claim 1, wherein the aromatic vinyl hydrocarbon content in the final block copolymer obtained by continuous polymerization is 5 to 95% by weight.

20. A process as claimed in claim 19, wherein the aromatic vinyl hydrocarbon content in the final block copolymer obtained by continuous polymerization is at least 5% by weight but less than 60% by weight 21. A process as claimed in claim 19, wherein the aromatic vinyl hydrocarbon content in the final block copolymer obtained by continuous polymerization is 60 to 95% by weight.

22. A process as claimed in claim 3, wherein said polyfunctional compound contains at least two functional groups selected from the group consisting of a halogen group, an epoxy group, an ester group, an acid anhydride group, a ketone group, an aldehyde group, an isocyanate group, an imino group, a vinyl group and a vinylidene group.

23. A process as claimed in claim 1, wherein a mixture of the block copolymers containing different aromatic vinyl hydrocarbon contents is continuously prepared by broadening the molecular-weight distribution of at least one polymer block formed in the continuous polymerization zone (b), said aromatic vinyl hydrocarbon contents of the block copolymers contained in the mixture being substantially continuously changed with the increase in the molecular weights of the block copolymers.

24. A process as claimed in claim 23, wherein a polymerization vessel having an L/D ratio of 7 or less is used as the polymerization vessel in which the polymer block having a broad molecular weight distribution in the continuous polymerization zone is prepared.

25. A process as claimed in claim 23, wherein the ratio of the weight-average molecular weight to the number-average molecular weight of the polymer block having a broad molecular weight distribution is at least 1.5.

26. A process as claimed in claim 25, wherein the polymer block having a broad molecular weight distribution is the polymer block composed mainly of the conjugated diene.

* * * * *